United States Patent [19]

Esser et al.

[11] 4,322,325
[45] Mar. 30, 1982

[54] WATER-DILUTABLE BINDER MIXTURE, AND ITS USE FOR THE PRODUCTION OF A TWO-LAYER METALLIC PAINT COATING

[75] Inventors: Klaus Esser; Helmut Dürr, both of Frankfurt am Main; Dieter Plath, Wiesbaden, all of Fed. Rep. of Germany

[73] Assignee: Hoechst Aktiengesellschaft, Frankfurt am Main, Fed. Rep. of Germany

[21] Appl. No.: 163,968

[22] Filed: Jun. 30, 1980

[30] Foreign Application Priority Data

Jun. 30, 1979 [DE] Fed. Rep. of Germany ....... 2926584

[51] Int. Cl.$^3$ .......................... C09D 3/64; C09D 5/10; C09D 5/38
[52] U.S. Cl. ................................. 523/457; 427/407.1; 523/402
[58] Field of Search ................. 260/22 EP; 427/407.1

[56] References Cited

U.S. PATENT DOCUMENTS

| | | | |
|---|---|---|---|
| 3,156,580 | 11/1964 | Howard | 427/407.1 |
| 3,196,119 | 7/1965 | Boller et al. | 260/22 EP |
| 3,218,274 | 11/1965 | Boller et al. | 260/22 EP |
| 3,770,675 | 11/1973 | Taft | 260/22 EP |
| 3,953,644 | 4/1976 | Camelon et al. | 427/407.1 |
| 4,132,686 | 1/1979 | Toyoshima et al. | 427/407.1 |
| 4,226,901 | 10/1980 | Sugiura et al. | 427/407.1 |

FOREIGN PATENT DOCUMENTS

| | | | |
|---|---|---|---|
| 52-53945 | 4/1977 | Japan | 427/407.1 |
| 987191 | 3/1965 | United Kingdom | 260/22 EP |
| 401695 | 2/1974 | U.S.S.R. | 106/253 |

*Primary Examiner*—Ronald W. Griffin
*Attorney, Agent, or Firm*—Hammond & Littell, Weissenberger and Muserlian

[57] ABSTRACT

A water-dilutable binder composition for the preparation of a metallic base paint comprising
(A) a water-soluble condensation product derived from
  (a) a saturated or unsaturated oil-free polyester containing OH-groups having been prepared from at least one polycarboxylic acid and at least one polyhydric alcohol,
  (b) a polycarboxylic acid mixture containing trimellitic acid,
  (c) at least one epoxidized oil, and
  (d) a basic compound;
(B) an additive selected from the group consisting of one or more metal powders, one or more metal powders in combination with at least one other pigment, and one or more metal powders in combination with at least one other dyestuff; and
(C) at least one water-miscible solvent a process for the preparation of a two-layer metallic paint coating with said composition.

10 Claims, No Drawings

WATER-DILUTABLE BINDER MIXTURE, AND ITS USE FOR THE PRODUCTION OF A TWO-LAYER METALLIC PAINT COATING

Metallic paint coatings have in recent years become very important in the automobile industry. Whilst in the past a high proportion of automobile bodies with such coatings were provided with single-coat metallic paints, automobiles are nowadays increasingly painted by a twocoat metallic-finish process, namely the so-called "wet-on-wet process". In this process, a base paint, which is essentially physically drying, and which is pigmented with aluminium, optionally with the addition of other colouring pigments, is first applied, and, after brief air-drying, a clear lacquer is applied as the top coat. The base paint consists in the main of a solvent, a physically drying binder, such as cellulose acetobutyrate, an oil free polyester, melamine resin and pigments. The pigments used include, in addition to aluminium, inorganic pigments such as titanium dioxide, lead chromate and iron oxides, as well as organic pigments, such as phthalocyanines, quinacridones or halogenated thioindigo pigments. The solids content of the base paints is about 15% and hence very low. The remaining 85% consist of volatile solvent, which is in the main composed of esters, such as ethylglycol acetate, butyl acetate and ethyl acetate, and aromatics, such as toluene or xylene.

The second coat, which is applied after an air-drying time of only a few minutes, is a clear lacquer which may be an air-drying lacquer, as is used in the case of, for example body repair work, or a baking lacquer, such as is used when an automobile is painted in conveyor-belt production. In the latter case, the two coats are hardened conjointly under conventional baking conditions (e.g. 10–30 minutes at 120°–150° C.).

The high proportion of solvent in the base paint may cause considerable pollution of the environment and in addition results in correspondingly high costs: that is to say costs due to the heavier coatings required as a result of the use of the solvent, and costs due to the removal of solvent under conditions which do not pollute the environment. There has therefore been no lack of attempts to increase the solids content or reduce the proportion of volatile solvents. In the course of these, it has been found that if the solids content is increased the application characteristics of the paint deteriorate and the quality of the total system suffers, so that this method of producing a metallic base paint which does not pollute the environment and is economical is not viable. Furthermore, attempts have been made to reformulate the metallic base paint so as to use water-soluble binders, in order thereby to achieve a non-polluting composition and good economics. The most serious disadvantages of these attempts has proved to be insufficient shelf life, difficulties in application, nonuniformity of the metallic effect, and a tendency of the aluminium constituents to turn grey.

According to the present invention there is provided a water-dilutable binder mixture for preparation of a metallic base paint which comprises (A) a water-soluble condensation product of (a) saturated or unsaturated, oil-free polyesters containing OH groups and having been prepared from at least one polycarboxylic acid and at least one polyhydric alcohol, (b) a polycarboxylic acid mixture containing trimellitic acid, (c) at least one epoxidised oil and (d) a basic compound;
(B) at least one metal powder,
(C) at least one water-miscible solvent; and, optionally,
(D) other pigments and/or dyestuffs; and, optionally,
(E) other conventional additives, which mixture can be used for the production of a two-coat metallic paint coating, and does not suffer from the above disadvantages in respect of shelf life, ease of application, greying and pollution of the environment.

Aqueous paints based on the binder mixtures according to the invention surprisingly require, when applied to a suitable substrate, a very short drying time at room temperature, in spite of a high water content (for example from 40 to 70% by weight, based on the sum of water and solvent), to achieve a dust-dry or tack-free coating; in general, this drying time is less than 10 minutes, mostly less than six minutes and in particular from three to five minutes. The reasons for this short drying time are not known. Possibly it is the result of the ease with which the resin releases the solvent, and, where relevant, also the result of the formation of readily volatile azeotropic mixtures. Drying at an elevated temperature is also feasible, and this substantially reduces the drying time, which is particularly advantageous where the time available within a predetermined process of operation is short and inadequate for physical drying. The composition furthermore exhibits good stability when stored at room temperature. The binder mixture has excellent intermediate adhesion. Application of the mixture presents no problems; because of the rapid drying, it does not run off vertical surfaces and shows no clouding; instead, the metallic effect develops very well. Furthermore, it lends itself excellently to overcoating, i.e. the dried coat is not attacked by the subsequently applied top coat. If aluminium pigments are used, the so-called "greying" effect is not observed.

Suitable oil-free polyesters possessing free OH groups (component (a)) may be prepared from known polycarboxylic acids, such as for example phthalic acid, isophthalic acid, terephthalic acid, trimellitic acid, fumaric acid, maleic acid, endomethylene-tetrahydrophthalic acid, succinic acid, adipic acid, suberic acid, azelaic acid, sebacic acid, alkyl-substituted compounds of these acids and their possible anhydrides. Examples of alcohol components of these polyesters include known polyhydric alcohols, such as ethylene glycol, the propanediols, butanediols and pentanediols, neopentyl glycol, hexanediols, diethylene glycol, glycerol, trimethylolethane, trimethylolpropane, pentaerythritol and dipentaerythritol. The components may be employed individually or as mixtures. The polyesters in general have OH numbers ranging from 60 to 150, especially from 80 to 120.

Polycarboxylic acid mixtures containing trimellitic acid (component (b)) include those which contain compounds of the formulae (I) to (III) (see accompanying sheet of formulae) and which are disclosed in German Patent Application No. P 27 07 018.4. In formulae (I) to (III), R, R' and R'', which may be the same or different, represent divalent to hexavalent, and preferably divalent, straight-chain or branched hydrocarbon radicals having a total of from 1 to 12, preferably of 2 to 6, carbon atoms, which radicals optionally possess up to two olefinic double bonds or are optionally interrupted by up to three ether bridges, x and y are integers from 2 to 6,
t is an integer from 1 to 5 and
z and u are zero or an integer from 1 to 5,
and in the formulae shown only as linear structures, that is to say shown for the case of divalent radicals R, R' and R", branches may be present, not only in the radicals R' and R" but also in the radical R. Such branched polycarboxylic acids cannot readily be represented by one formula alone. If, due to the possibility of R, R' and R" having a higher valency than 2, the compounds (I) to (III) are branched, the indices x, y and z in the various branches may be the same or different. Examples of compounds of formula (I) include esters of trimellitic acid containing several ester groups and derived from polyhydric, for example dihydric to hexahydric, saturated or unsaturated alcohols having 2 to 12 C atoms, including those alcohols which contain up to 3 ether groups. Examples of suitable alcohols for the preparation of these compounds are the diols already mentioned above, as well as their higher homologues and their unsaturated analogues, for example butenediols, as well as oligomers of ethylene glycol, and the polyhydric alcohols mentioned above, though the diols are preferred.

Examples of suitable compounds of formulae (I), (II) and (III) are those in which R, R' and R" are preferably divalent but can also be branched, depending on the structure and number of hydroxyl groups of the starting alcohol. In formulae (II) and (III), R, R' and R" may be the same or different and have the meaning given above for R.

Examples of typical radicals R, R' and R" include —$(CH_2)_n$— (wherein n is 2 to 10),

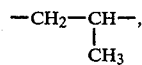

—$C_2$—CH=CH—$CH_2$—,  —$CH_2$—$CH_2$—O—$CH_2$—$CH_2$— and —$CH_2$—CH—$CH_2$—, as well as radicals of formulae (IV) (see accompanying sheet of formulae).

Accordingly, if x is 2, the compounds of formula (II) are diester-tetracarboxylic acids and if x is 3, they are triester-hexacarboxylic acids. The compounds of formula (III) are, for example, oligomeric polycarboxylic acids possessing several ester groups.

The compounds of formulae (I) to (III) may be prepared, for example, by hydrolysis of a mixture containing anhydride groups, such as is obtained on reacting trimellitic anhydride with the corresponding dihydric and/or polyhydric alcohols in a manner known per se. This hydrolysis can be carried out in the presence or absence of a solvent. If it is carried out in the presence of a solvent, solvent-free polycarboxylic acid mixtures can also be obtained by cautious distillation of the solvent, if necessary under reduced pressure. However, in many cases it is possible to select such a solvent mixture that a polycarboxylic acid solution suitable for further processing is obtained. The hydrolysis is particularly simple if the amount of water required for the hydrolysis is added to a melt or a solution of an anhydride mixture at an elevated temperature. To complete the hydrolysis, the mixture is stirred for some time at the same temperature.

Examples of solvents for the preparation of component (b) include, ethylene glycol monobutyl ether acetate, butyl acetate, methyl isobutyl ketone and mixtures containing them, for example a mixture of ethylene glycol monobutyl ether acetate and xylene, for example in a ratio of 1:1 to 1:3.

A particularly suitable method of characterising the mixtures containing anhydride groups is gel permeation chromatography (GPC) using a gel of polystyrene, cross linked with divinylbenzene, as the adsorbent and tetrahydrofuran as the eluent. By this method, the individual components of the anhydride mixtures may be determined accurately, so that the particular proportion of the individual components can readily and accurately be adjusted. In this way, the structure and amount of the compounds of formulae (I) to (III) can be accurately determined.

Advantageously, the content of compounds of formulae (I) to (III) in component (b) is 70 to 99.8, preferably 80 to 95, % by weight, whilst the content of trimellitic acid is 0.1 to 30, preferably 5 to 20, % by weight.

The content of oligomeric polycarboxylic acids (formula (III)) in the mixture of the compounds of formulae (I) to (III) can generally be between 0.1 and 99.8%, preferably between 30 and 70%. In addition, the polycarboxylic acid hardeners can consist of mixtures of individual components with different radicals R, R' and R" and different indices x, y, z, t and u.

The ratio in which the polyester (a) and the polycarboxylic acid mixture (b) are mixed is generally very important. Suitable values of the ratio of the solids in component (a) to the solids in component (b) are in general from 50:50 to 90:10, preferably from 60:40 to 85:15, and more particularly from 65:35 to 75:25.

Epoxidised oils, for example those based on soya bean oil, linseed oil, tall oil and castor oil, and generally having, in each case, an epoxy equivalent of 100 to 360, especially of 150 to 200, are employed as component (c). The condensation product of components (a) to (c) is rendered water-soluble by neutralisation with a basic compound (d), such as, for example, ammonia and aliphatic di- and tertiary amines, such as diisopropanolamine, dimethylaminoethanol, diethylaminoethanol, trimethylamine, triethylamine and tripropylamine.

The component (B) used in the mixtures of the invention consists of at least one metal powder such as copper, copper alloys, aluminium and steel, used individually or as mixtures; aluminium powder is preferred, at least as the predominant constituent; the amount of metal powder is in general 0.8 to 50, preferably 0.8 to 15, in particular 0.8 to 5, % by weight, relative to the binder.

Examples of optional dyestuffs or pigments (component (D)), which may be inorganic or organic, are titanium dioxide, graphite, carbon black, zinc chromate, strontium chromate, barium chromate, lead chromate, lead cyanamide, lead silicochromate, calcium molybdate, manganese phosphate, zinc oxide, cadmium sulphide, chromium oxide, zinc sulphide, nickel-titanium yellow, chromium-titanium yellow, red iron oxide, black iron oxide, ultramarine blue, phtalocyanine complexes, naphthol red, quinacridones, halogenated thioindigo pigments or the like. Their proportion is chosen to be such that it does not suppress the desired metallic effect.

The mixtures employed may also optionally contain other conventional additives (E), such as, for example, fillers, stabilisers, wetting agents, dispersing assistants, levelling agents, anti-foam agents and catalysts, individually or as mixtures, in the conventional amounts as well as inferior amounts of solvents being water-immiscible. These substances may be added to the individual components and/or to the total mixture. Other resins may also be employed as conventional additives, for example to increase the reactivity, for instance amine resins, especially melamine resins, for example in amounts of from 1 to 20% by weight, relative to the other binders.

Examples of suitable fillers include talc, mica, kaolin, chalk, quartz powder, asbestos powder, slate powder, barium sulphate, various silicas, silicates, glass fibres, organic fibres and the like.

Examples of suitable water-immiscible solvents include higher alcohols, for example with 4 to 8 carbon atoms, such as n-butanol and the various pentanols, hexanols and octanols, as well as aliphatic and aromatic hydrocarbons such as petrol fractions, toluene, the various xylenes, and esters of glycol ethers, for example the acetic acid esters of ethylglycol or butylglycol (i.e. of ethylene glycol monoethyl ether or ethylene glycol monobutyl ether).

To prepare the metallic base paints, water is added to the binders according to the invention. The paints contain conventional water-miscible solvents, for example monohydric or polyhydric alcohols, esters, glycol ethers or ketones. Specific examples of such solvents which may be mentioned are tert.-butanol, ethylglycol, butylglycol, butyldiglycol (i.e. ethylene glycol dibutyl ether), ethylene glycol dimethyl ether, diethylene glycol dimethyl ether, cyclohexanone, methyl ethyl ketone, acetone, isophorone and mixtures of these.

In producing metallic paint coatings the aqueous binder mixture is applied to a prepared surface, for example sprayed onto an automobile body which has been treated with a filler, and after air-drying is covered with a top lacquer coat. Both coats may then be baked in a single operation, for example for 40 to 10 minutes at 100° to 180° C., the temperature being inter-related with the baking time.

The thicknesses of the individual coats to be applied to the substrate are in general from 10 to 40, preferably from 15 to 25, $\mu$m for the base paint, and in general from 20 to 70, preferably from 30 to 50, $\mu$m for the top lacquer coat.

Examples of articles and surfaces suitable for coating with the binder mixtures according to the invention are those of metal, plastic, wood and the like.

The invention is illustrated by the following Examples in which parts and % are always by weight.

EXAMPLE 1

53 Parts of a 40% aqueous solution of a water-soluble commercial condensation product based on a polyester which contains OH groups (the polyester having an OH number of about 100, and being derived from phthalic anhydride, trimethylolpropane and 2,2-dimethylpropanediol), a bis-anhydride, obtained by reacting 2 mols of trimellitic anhydride with 1 mol of propanediol and subsequent rearrangement of the product, and an epoxidized soya bean oil having an epoxy equivalent weight of 170–180, the aqueous solution being neutralised with dimethylaminoethanol to pH 6.5, are compounded with 0.8 parts of a highly disperse capillary-active silica, 9.8 parts of aluminium paste (metal content 65%; solvent: white spirit and benzene; average particle size determined according to DIN 4190, 20 $\mu$m; specific gravity 1.5), 34 parts of ethanol and 2.3 parts of water to give a metallic base paint. This base paint is diluted by adding about 15 parts of a mixture of ethanol and water (in the ratio of 60:40) so as to have a cup flow time appropriate for spraying, namely 16 seconds at 20° C. (measured in a DIN cup with 4 mm nozzle, according to DIN 53 211), and is sprayed pneumatically onto an automobile sealer to give a dry film thickness of 16 $\mu$m. After air-drying for 5 minutes, a lacquer having the composition shown below is sprayed, as a top coat, onto the film, and the two coats are baked conjointly, in one operation, for 20 minutes at 140° C.

The clear lacquer for the two-coat metallic paint finishing treatment consists of 56.6 parts of a commercial acrylic resin which can be crosslinked with an extraneous hardening agent (a 65% solution in a 3:1 mixture of xylene and n-butanol; dynamic viscosity of a 50% solution in xylene: 1 140 mPa.s/20° C.; acid number 13, based on solid resin), 28.7 parts of a partially isobutanol-etherified melamine resin (about 55% solution in a 44:1 isobutanol/xylene mixture, molar ratio of melamine:formaldehyde=1:4, etherified with 3 mols of isobutanol; dynamic viscosity of a 55% solution in butanol: 500 mPa.s/20° C. as a hardener, 1.5 parts of an aromatic hydrocarbon mixture of boiling range 180° to 210° C., 5.3 parts of isobutanol and 9.7 parts of xylene. This clear lacquer is brought to a spraying consistency (a 26 second flow time at 23° C., measured in a DIN cup with 4 mm nozzle, according to DIN 53 211) with a hydrocarbon mixture of boiling range 150° to 180° C., and is applied to give a dry film thickness of 40 $\mu$m.

EXAMPLE 2

Example 1 is repeated, with the difference that in place of the 9.8 parts of aluminium paste only 6.6 parts of aluminium paste and 3.2 parts of a copper phthalocyanine pigment in the pure $\beta$-modification (density 1.6 g/cm$^3$, specific surface area 57 m$^2$/g, mean particle size 0.066 $\mu$m) are employed.

EXAMPLE 3

Example 1 is repeated, with the difference that in place of the 9.8 parts of aluminium paste only 6.6 parts of aluminium paste and 3.2 parts of a benzimidazolone pigment (density 1.5 g/cm$^3$, specific surface area 17.5 m$^2$/g, mean particle size 0.23 $\mu$m) are employed.

Examples 2 and 3 give coatings with good properties similar to those obtained in Example 1.

COMPARATIVE EXAMPLE 1

45 Parts of a partially condensed commercial alkyd resin consisting of a castor oil alkyd and a maleate oil (70% solution in a 10:1 water/diacetone-alcohol mixture; dynamic viscosity (diluted 100:20 with water) 90 mPa.s/20° C.; density 1.07) are compounded with 4 parts of a partially methanol-etherified melamine resin (about 70% in isobutanol, molar ratio of melamine:formaldehyde=1:4, etherified with 3 mols of methanol; dynamic viscosity (70% solution in isobutanol) 2 400 mPa.s/20° C.; acid number <1), 0.8 part of pyrogenic silica, 9.8 parts of the aluminium paste mentioned in Example 1 and 5.8 parts of water, to give a metallic paint, which is diluted, sprayed and baked, all as in Example 1.

COMPARATIVE EXAMPLE 2

Comparative Example 1 was repeated, but 22.5 parts of an oil-free saturated commercial polyester resin (80% solution in a 12:11:7 mixture of butylglycol/butyldiglycol/ethylglycol; dynamic viscosity (60% solution in ethylglycol) at 20° C.: 500 mPa.s; density 1.11; acid number (based on solid resin, determined according to DIN 53 402): 60) were used as the resin component.

The results of various tests on the products of Example 1 and Comparative Examples 1 and 2 are shown in the following Table.

TABLE

|  | Example 1 | Comparative Experiment 1 | Comparative Experiment 2 |
| --- | --- | --- | --- |
| Shelf life of the base paint: examined after 90 days storage at 20° C. | No change | Severe greying of the aluminum particles | Has gelled |
| Application by spraying | No run-off | Run-off, "sags" and blisters | Run-off, "sags" and blisters |
| Dryness of the base paint after 5 minutes' air-drying, before overcoating | Dust-dry, non-tacky | Slightly tacky | Very tacky |
| Assessment of the baked two-coat finish | Flawless metallic-effect finish with high gloss | Cloudy (flop) effect; gloss distinctly poorer than Example 1 | Severe dissolving of the base paint surface; aluminum particles have floated up into the top coat |

Sheet of formulae

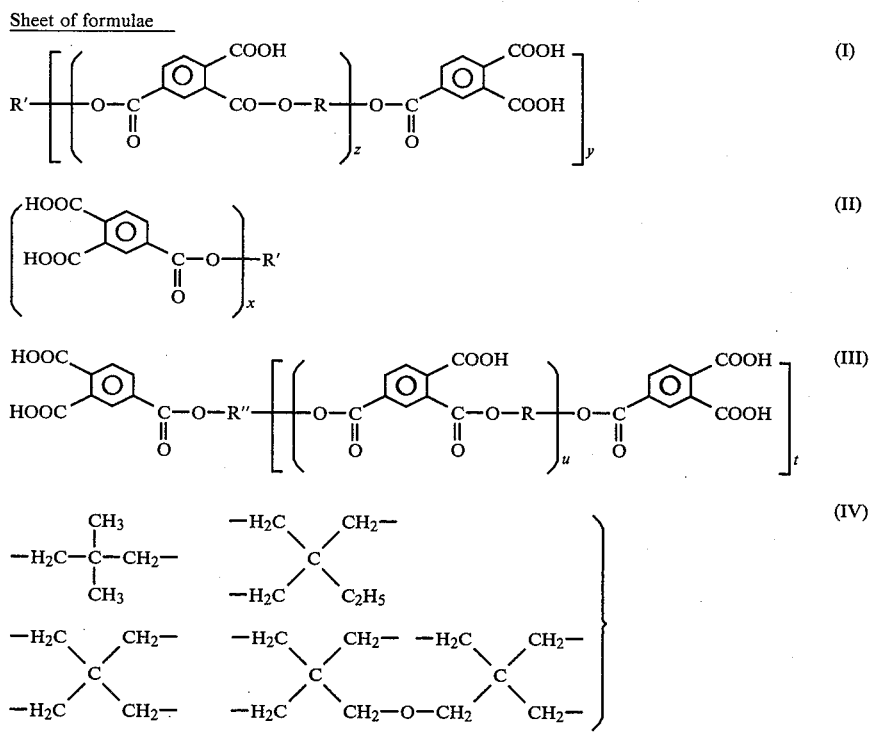

We claim:
1. A water-dilutable binder composition for the preparation of a metallic base paint comprising
   (A) a water-soluble condensation product derived from
      (a) a saturated or unsaturated oil-free polyester containing OH-groups having been prepared from at least one polycarboxylic acid and at least one polyhydric alcohol,
      (b) a polycarboxylic acid mixture containing trimellitic acid,
      (c) at least one epoxidized fatty oil, and
      (d) a basic compound;
   (B) an additive selected from the group consisting of one or more metal powders, one or more metal powders in combination with at least one other pigment, and one or more metal powders in combination with at least one other dyestuff; and
   (C) at least one water-miscible (compatible) solvent.

2. A binder composition according to claim 1, wherein component (a) has a hydroxy number between 80 and 120 and component (c) has an epoxy equivalent between 100 and 360.

3. A binder composition according to claim 1, wherein component (B) is predominantly aluminium powder.

4. A binder composition according to claim 1, wherein component (B) is present in an amount of from 0.8 and 50% by weight, referred to the binder.

5. A binder according to claim 1, wherein the weight ratio of solids of component (a) to component (b) is between 50:50 and 90:10.

6. A water-dilutable binder composition as claimed in claim 1 for the preparation of a metallic base paint comprising
(A) a water-soluble condensation product derived from
(a) a saturated or unsaturated oil-free polyester containing OH-groups having been prepared from at least one polycarboxylic acid and at least one polyhydric alcohol,
(b) a polycarboxylic acid mixture containing trimellitic acid,
(c) at least one epoxidized fatty oil, and
(d) a basic compound;
(B) an additive selected from the group consisting of one or more metal powders, one or more metal powders in combination with at least one other pigment, and one or more metal powders in combination with at least one other dyestuff; and
(C) at least one water-miscible (compatible) solvent; wherein component (a) has a hydroxy number between 60 and 150, component (B) is predominently aluminium powder and which component is present in an amount between 0.8 and 50% by weight referred to the binder, and wherein the weight ratio of solids of component (a) to component (b) is between 50:50 and 90:10.

7. A binder according to claim 1 or claim 6, wherein component (A) is a condensation product derived from (a) a polyester based on phthalic anhydride, trimethylolpropane and 2,2-dimethylpropanediol, (b) a bis-anhydride from 2 mols of trimellitic acid anhydride and one mol of propanediol, (c) an epoxidized soya-bean oil having an epoxy equivalent weight between 170 and 180, and (d) dimethylaminoethanol; component (B) is aluminium powder; component (C) is ethanol; and the binder additionally contains finely-divided silica.

8. A process for the preparation of a two-layer metallic paint coating consisting of a first metallic base paint layer and a second covering lacquer layer on a substrate, which comprises applying a binder composition according to claim 1 diluted with water to the substrate to form the metallic base paint layer, drying the base layer to obtain a tack-free surface, and then applying a covering lacquer layer to the dried base layer.

9. A process according to claim 8 wherein the base layer is dried within a period of time of less than 10 minutes at ambient temperature.

10. A process according to claim 8 or claim 9, wherein the binder composition according to claim 1 diluted with water has a water content of from 40 to 70% by weight based upon the total amount of solvent and water contained therein.

* * * * *

UNITED STATES PATENT AND TRADEMARK OFFICE
CERTIFICATE OF CORRECTION

PATENT NO. : 4,322,325
DATED : March 30, 1982
INVENTOR(S) : KLAUS ESSER ET AL.

It is certified that error appears in the above—identified patent and that said Letters Patent is hereby corrected as shown below:

Column 1, line 23: "thi-" should read -- thio- --.

Column 1, line 24: "oindigo" should read -- indigo --.

Column 3, line 39: "CH-", last occurrence, should read -- $CH_2$- --.

Column 3, line 40: Delete "$_2$-".

Signed and Sealed this

Seventeenth Day of August 1982

[SEAL]

Attest:

Attesting Officer

GERALD J. MOSSINGHOFF

Commissioner of Patents and Trademarks